Jan. 16, 1934.  E. HOPKINSON  1,943,437
MANUFACTURE OF RUBBER THREAD
Filed May 9, 1931  2 Sheets-Sheet 1
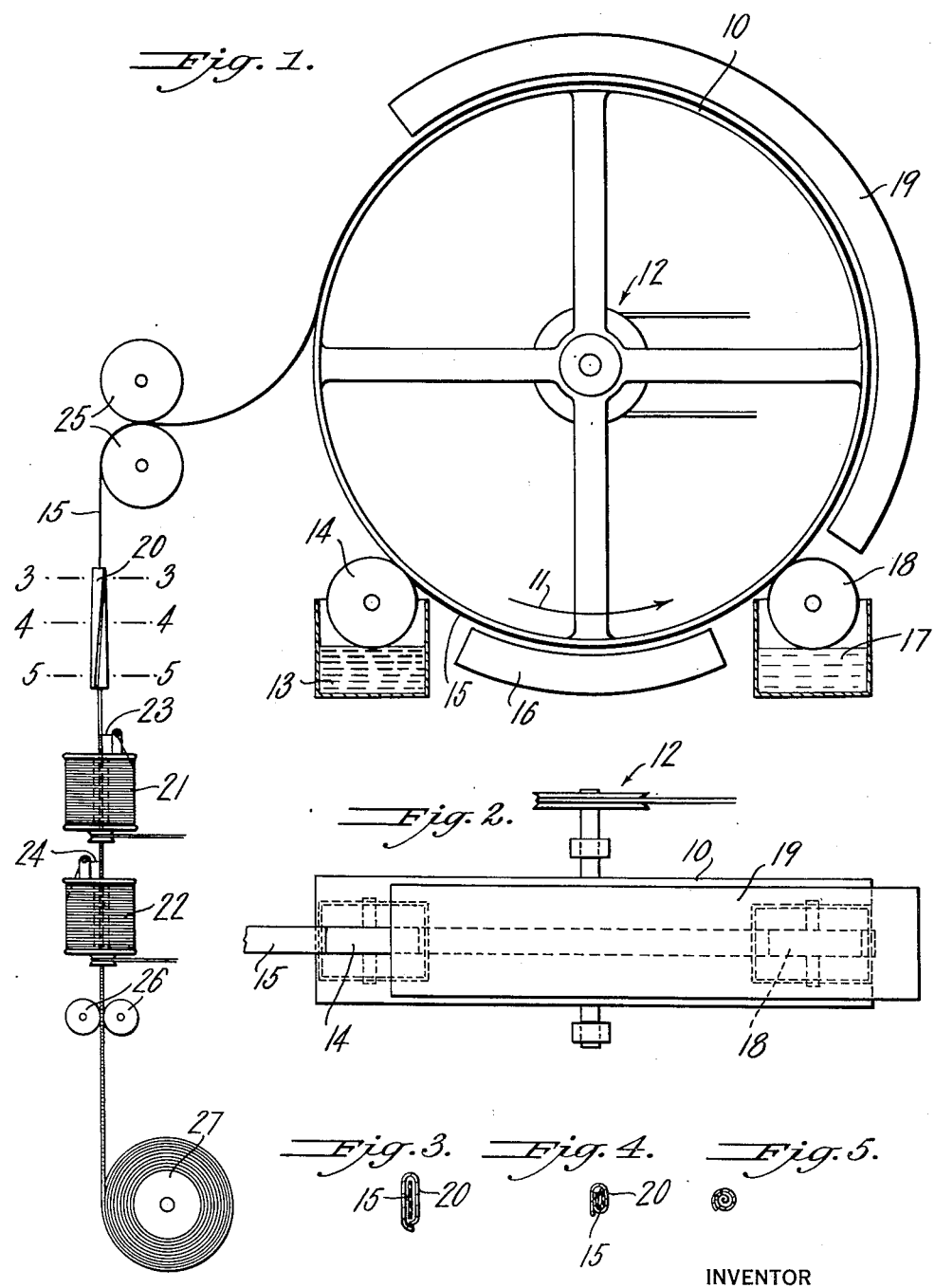
INVENTOR
ERNEST HOPKINSON
ATTORNEY

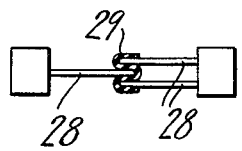
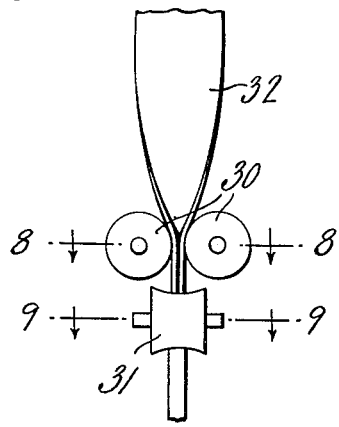
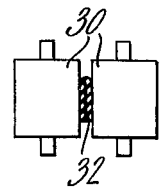
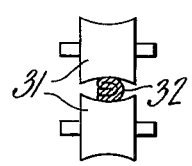

Patented Jan. 16, 1934

1,943,437

UNITED STATES PATENT OFFICE 1,943,437

MANUFACTURE OF RUBBER THREAD

Ernest Hopkinson, New York, N. Y., assignor to National India Rubber Company, Providence, R. I., a corporation of Rhode Island Application May 9, 1931. Serial No. 536,194

5 Claims. (Cl. 117—57)

This invention relates to a process for the manufacture of rubber thread and has for an object the continuous and expeditious production of such thread in an easy and inexpensive manner preferably from aqueous dispersions of rubber such as latex, either natural or artificial.

Other objects and advantages of the invention will appear as the description proceeds, reference being made to the accompanying drawings in which:

Figure 1 is a view in elevation and partly in section of apparatus suitable for carrying out the invention;

Fig. 2 is a plan view of a portion of Fig. 1;

Figs. 3, 4 and 5 are transverse sections on the lines 3—3, 4—4 and 5—5 of Fig. 1 showing the development of a rubber film into substantially round thread;

Fig. 6 is a sectional view of a device for gathering a rubber film transversely of its length;

Fig. 7 is another form of gathering or folding device; and

Figs. 8 and 9 are sections on the lines 8—8 and 9—9 of Fig. 7.

The invention may be embodied in various ways. As an example there may be provided a continuously advancing surface in the form of a flat-surfaced drum 10 suitably journaled and rotated in the direction of the arrow 11, at a suitable speed by a belt and pulley 12. Adjacent the bottom of the drum 10 there is stationed a supply of suitable rubber-containing fluid 13, such as latex. A wheel 14 dipping into the supply of rubber-containing fluid 13 engages the surface of the drum 10 and continuously forms thereon a film or strip 15 of the rubber fluid 13 corresponding to the width of the wheel 14. As the drum carries the strip around in the direction of the arrow 11 it is preferably subjected to a preliminary drying treatment by means of a heater 16, which removes at least some of the contained moisture from the strip. After passing the heater 16, the strip 15 preferably receives an application of an accelerating medium 17 which is supplied by a wheel 18 rotating in engagement with the drum. The rubber fluid 13 may contain any desirable ingredients to be acted upon by a suitable accelerator to speed vulcanization of the strip 15. After application of the accelerator 17 the advancing strip is subjected to vulcanizing treatment by means of a heater 19 properly positioned and regulated preferably to completely vulcanize the strip on the drum. The strip 15 is next removed from the drum 10 and folded in any suitable manner transversely of its length to approximate the form of a round thread, and while thus conditioned is provided with a fibrous cover. It may be found advantageous to direct an air blast between the strip 15 and the drum 10 adjacent the point where the strip leaves the drum to facilitate removal of the strip. Any suitable means may be employed for folding the strip 15. For example, a forming device of the character indicated at 20 having a substantially convolute section and through which the rubber strip passes is effective to progressively coil the strip through the different stages indicated in Figs. 3, 4 and 5, so that the rubber strip partakes of the form of an approximately round thread. The term "folding" is to be considered herein as including coiling, inasmuch as a coil is recognized as a specific type of fold. Upon leaving the bottom of the forming device 20 the folded strip is provided with a suitable cover, such as fibrous thread laid on in one or more layers. For this purpose there may be provided a pair of spinners 21 and 22 rotating in opposite directions around the coiled strip 15 to apply the threads 23 and 24, as usual in the art of covering rubber thread.

During the forming and thread applying operations the strip 15 is preferably kept under tension as by suitably stretching between pairs of nip rolls 25 and 26 at opposite sides of the forming and thread applying means. The finished product may be accumulated upon a reel 27.

Another way of folding the strip into the shape of a thread is illustrated in Fig. 6. In this instance a series of interfitting combs 28 engage a moving strip 29 from opposite sides and fold or gather it transversely of its length. While thus conditioned the strip may be provided with a fibrous cover, for instance, as disclosed in Fig. 1.

Various other folding means may be employed. Fig. 7 discloses pairs of rollers 30 and 31 disposed at a right-angle to each other and effective to fold or gather a strip 32 first as shown in Fig. 8, by making a transverse fold, and then refolding as indicated in Fig. 9. Any other suitable means may be used for folding the strip, and the type of fold may be varied as desired.

It is to be understood that the above described apparatus is merely illustrative of one practical means for carrying out the invention which may be otherwise embodied in variations and modifications within the scope of the appended claims. Furthermore, the composition of the rubber strip may be varied at will. Natural latex has been found to possess the most desirable physical characteristics for the manufacture of rubber thread, but it is obvious that any suitable rubber-containing fluids or dispersions of rubber may be used. For instance, the latex bath 13 may contain only latex, and the accelerator bath 17 may contain a mixture of curing and accelerating agents, or a single bath may be employed containing all the ingredients necessary to the finished thread, which would ordinarily include a curing ingredient, such as sulphur, and any desired accelerating agents. As a further example, the latex bath may contain latex and a curing agent, and the accelerator bath contain only an accelerator. Also a rubber fluid consisting of vulcanized latex may be used, in which case the accelerator is dispensed with, and the heaters 16 and 19 operate as driers for the strip laid upon the drum. The invention in its broad aspects consists in the formation of a rubber strip of any desired ingredients, and the folding thereof as by coiling or otherwise after drying or vulcanizing, and the covering thereof with fibrous material, or the formation of a thread by folding as above prior to complete vulcanization or drying.

Having thus described my invention, what I claim and desire to protect by Letters Patent is:

1. The method of manufacturing elastic thread, which comprises continuously forming a thin, narrow band of rubber dispersion on a moving surface, heating the band to coagulate and withdraw moisture from the dispersion, continuously folding the band into thread shape, and continuously spirally covering the formed thread with fibrous material.

2. The method of manufacturing elastic thread comprising applying an aqueous dispersion of rubber to a travelling surface to form a film thereon, drying the film and removing the same and forming a continuous narrow strip therefrom, and spirally covering the strip with fibrous material to form an elastic thread therefrom.

3. The method of manufacturing elastic thread comprising applying an aqueous dispersion of rubber to a travelling surface to form a film thereon, drying the film and removing the same in the form of a continuous narrow strip and spirally covering the strip with fibrous material to form an elastic thread therefrom.

4. The method of manufacturing elastic thread comprising applying an aqueous dispersion of rubber to a travelling surface to form a film thereon, drying the film and removing the same in the form of a continuous narrow strip, folding the strip transversely, and spirally covering the folded strip with fibrous material to form an elastic thread therefrom.

5. The method of manufacturing elastic thread comprising applying an aqueous dispersion of rubber to a travelling surface to form a film thereon, drying the film and removing the same and forming a continuous narrow strip therefrom, and simultaneously folding and spirally covering the strip with fibrous material to form an elastic thread therefrom.

ERNEST HOPKINSON.